(12) United States Patent
Chen

(10) Patent No.: US 10,884,566 B2
(45) Date of Patent: Jan. 5, 2021

(54) TOUCH SUBSTRATE, TOUCH SCREEN, AND ELECTRONIC DEVICE

(71) Applicant: Wuhan China Star Optoelectronics Semiconductor Display Technology Co., Ltd., Wuhan (CN)

(72) Inventor: Caiqin Chen, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/484,228

(22) PCT Filed: Oct. 11, 2018

(86) PCT No.: PCT/CN2018/109915
§ 371 (c)(1),
(2) Date: Aug. 7, 2019

(87) PCT Pub. No.: WO2020/037793
PCT Pub. Date: Feb. 27, 2020

(65) Prior Publication Data
US 2020/0293148 A1  Sep. 17, 2020

(30) Foreign Application Priority Data

Aug. 21, 2018 (CN) .......................... 2018 1 0956119

(51) Int. Cl.
*G09G 1/00* (2006.01)
*G06F 3/044* (2006.01)

(52) U.S. Cl.
CPC .......... *G06F 3/0446* (2019.05); *G06F 3/0443* (2019.05); *G06F 2203/04111* (2013.01)

(58) Field of Classification Search
CPC ...... G06F 3/041; G06F 3/0412; G02F 1/1333; G02F 1/1343; G02F 1/1335; G09G 3/3208
See application file for complete search history.

(56) References Cited

U.S. PATENT DOCUMENTS

| 2015/0220191 A1* | 8/2015 | Huh | ........................ G06F 3/044 345/173 |
| 2018/0113345 A1* | 4/2018 | Song | ........................ G06F 3/044 |
| 2018/0188582 A1* | 7/2018 | Teng | ...................... G06F 3/0412 |
| 2018/0314372 A1* | 11/2018 | Lee | ........................ G06F 3/0446 |

* cited by examiner

*Primary Examiner* — Michael A Faragalla

(57) ABSTRACT

A touch substrate, a touch screen, and an electronic device are provided. The touch substrate includes a touch layer. The touch layer includes at least two electrode blocks having a first electrode group and a second electrode group. The first electrode group includes at least two first electrodes arranged in a first direction and/or a second direction, and the second electrode group includes at least two second electrodes arranged in the first direction and/or the second direction.

12 Claims, 4 Drawing Sheets

TOUCH SUBSTRATE, TOUCH SCREEN, AND ELECTRONIC DEVICE

RELATED APPLICATIONS

This application is a National Phase of PCT Patent Application No. PCT/CN2018/109915 having International filing date of Oct. 11, 2018, which claims the benefit of priority of Chinese Patent Application No. 201810956119.4 filed on Aug. 21, 2018. The contents of the above applications are all incorporated by reference as if fully set forth herein in their entirety.

FIELD AND BACKGROUND OF THE INVENTION

The present application relates to a field of display, and in particular, to a touch substrate, a touch screen, and an electronic device.

Currently, more popular touch technologies include out-cell touch technology and in-cell touch technology. The in-cell touch technology refers to integration of a touch sensor into a touch substrate, and the out-cell touch technology refers embedding the touch sensor between a color filter substrate and a polarizer in a display screen.

In current in-cell touch technology, the touch sensor is classified into two types: a self-capacitive type and a mutual capacitive type. In the above mentioned two types of capacitive touch technologies, parameters for measuring touch efficiency of a touch screen are: high signal-noise ratio, high precision, low delay, high linearity, and the like. The signal-noise ratio (SRN) is proportional to the actual capacitance change $\Delta C1$. A larger value of the $\Delta C1$ is, a larger value of the signal-noise ratio is, and the touch screen sensitivity is higher.

Based on the above described background, the present application provides a high sensitivity touch screen.

SUMMARY OF THE INVENTION

The present application provides a touch substrate, a touch screen, and an electronic device, to solve the technical problem of existing touch screen that touch sensitivity is low.

In order to solve the above described problems, the technical solutions provided by the present application are as follows:

The present application provides a touch substrate, including:

a substrate; and a touch layer disposed on the substrate, wherein the touch layer includes at least two electrode blocks arranged in a first direction and/or a second direction and sequentially connected to each other, and the electrode blocks include a first electrode group and a second electrode group; and wherein the first electrode group includes at least two first electrodes arranged in the first direction and/or the second direction, the second electrode group includes at least two second electrodes arranged in the first direction and/or the second direction, and the first electrodes and the second electrodes are insulated from each other and disposed crosswise in the electrode blocks.

In the touch substrate according to the present application, the first electrode group and the second electrode group in each of the electrode blocks are insulated from each other, and disposed crosswise on the touch layer.

In the touch substrate according to the present application, in the first direction, two of the first or second electrodes adjacent to each other are electrically connected to each other by at least one first metal bridge; and in the second direction, two of the first or second electrodes adjacent to each other are electrically connected to each other by at least one second metal bridge;

wherein the first metal bridge or the second metal bridge is belonged to a same metal layer of the first electrodes and the second electrode, and the first metal bridge and the second metal bridge are different metal layers.

In the touch substrate according to the present application, the first metal bridge is belonged to the same metal layer of the first electrodes and the second electrode, and at least one first insulating layer is disposed between the second metal bridge and the first electrodes, and disposed between the second metal bridge and the second electrodes.

In the touch substrate according to the present application, at least two first via holes are formed in the first insulating layer, and the second metal bridge electrically connects the two adjacent first or second electrodes to each other by the first via holes; and wherein the second metal bridge is located between the substrate and the touch layer; or the second metal bridge is located on the touch layer.

In the touch substrate according to the present application, in the first direction, two of the electrode blocks adjacent to each other are electrically connected to each other by at least one third metal bridge; and in the second direction, two of the electrode blocks adjacent to each other are electrically connected to each other by at least one fourth metal bridge.

In the touch substrate according to the present application, the third metal bridge electrically connects the first electrodes of the first electrode group in the two adjacent electrode blocks, and the fourth metal bridge electrically connects the second electrodes of the second electrode group in the two adjacent electrode blocks; or wherein the third metal bridge electrically connects the second electrodes of the second electrode group in the two adjacent electrode blocks, and the fourth metal bridge electrically connects the first electrodes of the first electrode group in the two adjacent electrode blocks.

In the touch substrate according to the present application, the third metal bridge or the fourth metal bridge is belonged to a same metal layer of the first electrodes and the second electrode; and the third metal bridge and the fourth metal bridge are different metal layers.

In the touch substrate according to the present application, the third metal bridge is the same metal layer of the first electrodes and the second electrode, and at least one second insulating layer is disposed between the fourth metal bridge and the first electrode, and disposed between the fourth metal bridge and the second electrodes.

In the touch substrate according to the present application, at least two second via holes are formed in the second insulating layer, and the fourth metal bridge electrically connects the two adjacent second or fourth electrodes to each other by the second via holes; and wherein the fourth metal bridge is located between the substrate and the touch layer; or the fourth metal bridge is located on the touch layer.

The present invention provides a touch screen, including:

a touch substrate, wherein the touch substrate includes a substrate and a touch layer disposed on the substrate, and the touch layer includes at least two electrode blocks arranged in a first direction and/or a second direction and sequentially connected to each other, and the electrode blocks includes a first electrode group and a second electrode group; and wherein the first electrode group includes at least two first electrodes arranged in a first direction and/or a second direction, the second electrode group includes at least two second electrodes arranged in a first direction and/or a second direction, and the first electrodes and the second electrodes are insulated from each other and disposed crosswise in the electrode blocks.

In the touch screen according to the present application, the first electrode group and the second electrode group in each of the electrode blocks are insulated from each other and disposed crosswise on the touch layer.

In the touch screen according to the present application, in the first direction, two of the first or second electrodes adjacent to each other are electrically connected to each other by at least one first metal bridge; and in the second direction, two of the first or second electrodes adjacent to each other are electrically connected to each other by at least one second metal bridge;

wherein the first metal bridge or the second metal bridge is belonged to a same metal layer of the first electrodes and the second electrode, and the first metal bridge and the second metal bridge are different metal layers; and wherein the first metal bridge is belonged to the same metal layer with the first electrodes and the second electrode, and at least one first insulating layer is disposed between the second metal bridge and the first electrodes, and disposed between the second metal bridge and the second electrodes.

In the touch screen according to the present application, in the first direction, two of the electrode blocks adjacent to each other are electrically connected to each other by at least one third metal bridge;

in the second direction, two of the electrode blocks adjacent to each other are electrically connected to each other by at least one fourth metal bridge; and wherein the third metal bridge electrically connects the first electrodes of the first electrode group in the two adjacent electrode blocks, and the fourth metal bridge connects the second electrodes of the second electrode group in the two adjacent electrode blocks; or wherein the third metal bridge electrically connects the second electrodes of the second electrode group in the two adjacent electrode blocks, and the fourth metal bridge connects the first electrodes of the first electrode group in the two adjacent electrode blocks.

In the touch screen according to the present application, the third metal bridge or the fourth metal bridge is belonged to a same metal layer of the first electrodes and the second electrode, and the third metal bridge and the fourth metal bridge are different metal layers; and the third metal bridge is belonged to the same metal layer of the first electrodes and the second electrode, and at least one second insulating layer is disposed between the fourth metal bridge and the first electrode, and disposed between the fourth metal bridge and the second electrodes.

The present invention provides an electronic device, including:

a touch screen, the touch including:

a touch substrate, wherein the touch substrate includes a substrate and a touch layer disposed on the substrate, and the touch layer including at least two electrode blocks arranged in a first direction and/or a second direction and sequentially connected to each other, and the electrode blocks includes a first electrode group and a second electrode group; and wherein the first electrode group includes at least two first electrodes arranged in a first direction and/or a second direction, the second electrode group includes at least two second electrodes arranged in a first direction and/or a second direction, and the first electrodes and the second electrodes are insulated from each other and disposed crosswise in the electrode blocks.

In the electronic device according to the present application, the first electrode group and the second electrode group in each of the electrode blocks are insulated from each other and disposed crosswise on the touch layer.

In the electronic device according to the present application, in the first direction, two of the first or second electrodes adjacent to each other are electrically connected to each other by at least one first metal bridge; and in the second direction, two of the first or second electrodes adjacent to each other are electrically connected to each other by at least one second metal bridge;

wherein the first metal bridge or the second metal bridge is belonged to a same metal layer of the first electrodes and the second electrode, and the first metal bridge and the second metal bridge are different metal layers; and wherein the first metal bridge is belonged to the same metal layer with the first electrodes and the second electrode, and at least one first insulating layer is disposed between the second metal bridge and the first electrodes, and disposed between the second metal bridge and the second electrodes.

In the electronic device according to the present application, in the first direction, two of the electrode blocks adjacent to each other are electrically connected to each other by at least one third metal bridge;

in the second direction, two of the electrode blocks adjacent to each other are electrically connected to each other by at least one fourth metal bridge; and wherein the third metal bridge electrically connects the first electrodes of the first electrode group in the two adjacent electrode blocks, and the fourth metal bridge electrically connects the second electrodes of the second electrode group in the two adjacent electrode blocks; or wherein the third metal bridge electrically connects the second electrodes of the second electrode group in the two adjacent electrode blocks, and the fourth metal bridge electrically connects the first electrodes of the first electrode group in the two adjacent electrode blocks.

In the electronic device according to the present application, the third metal bridge or the fourth metal bridge is belonged to the same metal layer of the first electrodes and the second electrode, and the third metal bridge and the fourth metal bridge are different metal layers; and wherein the third metal bridge is belonged to the same metal layer of the first electrodes and the second electrode, and at least one second insulating layer is disposed between the fourth metal bridge and the first electrode, and disposed between the fourth metal bridge and the second electrodes.

Beneficial effect: the present application increases relative side lengths of the first electrodes and the second electrode by providing first and second electrodes in the electrode blocks that are insulated from each other, and disposed crosswise, so the fringe field capacitance is increased, and the signal-noise ratio of the touch substrate is improved, results that enhances the touch sensitivity of the touch substrate.

BRIEF DESCRIPTION OF THE SEVERAL VIEWS OF THE DRAWINGS

To more clearly illustrate the technical solutions in the embodiments of the present invention, the drawings used in the description of the embodiments will be briefly described below. It is apparent that the drawings accompanying with the following description are only some embodiments of the present invention. Other drawings can also be obtained from those skilled in the art based on these drawings without paying any creative effort.

DESCRIPTION OF SPECIFIC EMBODIMENTS OF THE INVENTION

The following descriptions for the respective embodiments are specific embodiments capable of being implemented for illustrations of the present application with referring to accompanied figures. For example, the directional terms used in this application such as "up", "down", "front", "rear", "left", "right", "interior", "exterior", "side", etcetera are merely directions that refer to the accompanied figures. Therefore, the wordings of directions are employed for explaining and understanding the present application but not limitations thereto.

Figure 1:
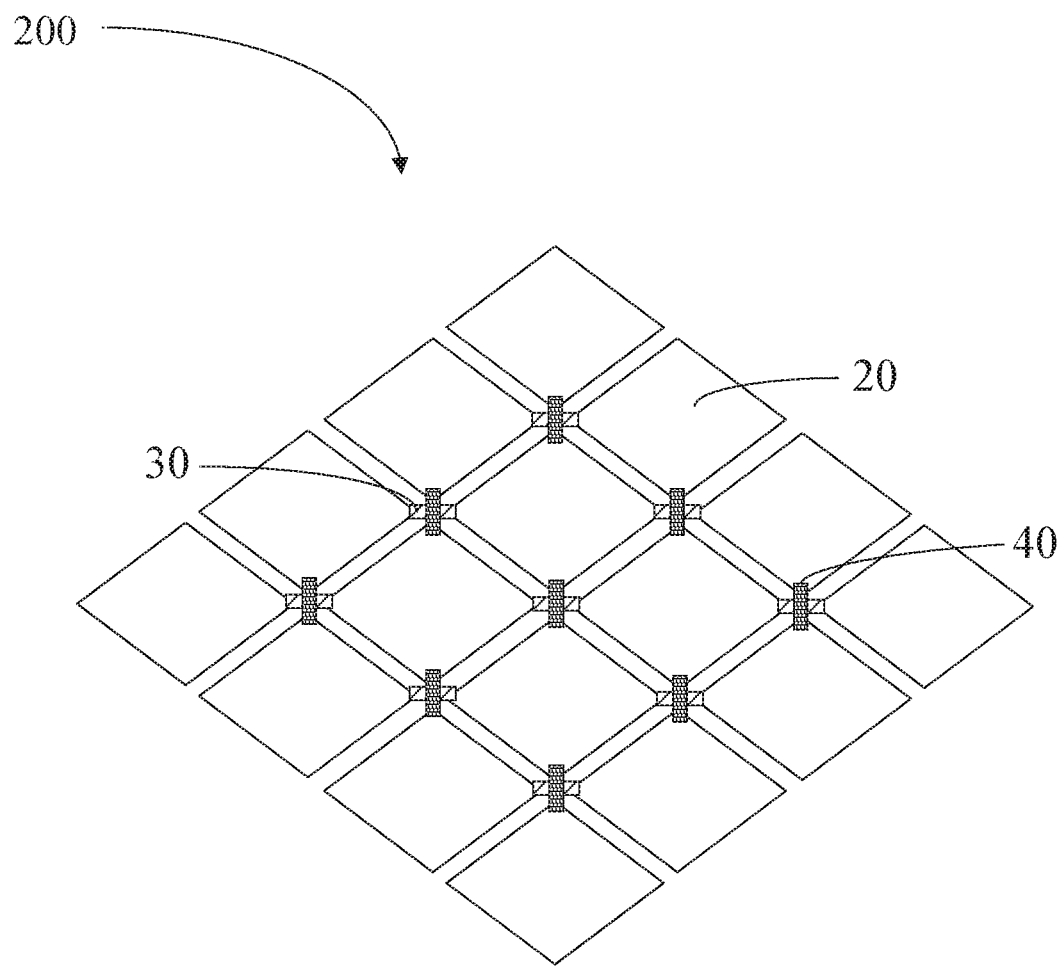
FIG. 1 is a structural view of a touch layer in a touch substrate according to the present application.

Please refer to FIG. 1. FIG. 1 is a structural view of a touch layer in a touch substrate according to the present application.

A touch substrate 100 includes a base substrate configured as a base, and a touch layer 200 disposed on the substrate. The touch layer 200 includes at least two electrode blocks 20 arranged in a first direction and/or a second direction and sequentially connected to each other.

In an embodiment, the first direction is a row direction, and the second direction is a column direction.

The electrode blocks 20 arranged in the first direction are electrically connected by a third metal bridge 30, and the electrode blocks 20 arranged in the second direction are electrically connected by a fourth metal bridge 40. Two of electrode blocks 20 adjacent to each other is connected through the metal bridge, such that two rows or two columns of the electrode blocks 20 adjacent to each other are insulated from each other.

In an embodiment, each of the electrode blocks 20 includes a first electrode group and a second electrode group. The first electrode group and the second electrode group in each of the electrode blocks 20 are insulated from each other and disposed crosswise on the touch layer 200.

In an embodiment, a first electrode group includes at least two first electrodes 201 arranged in the first direction and/or the second direction, and the second electrode group includes at least two second electrodes 202 arranged in the first direction and/or the second direction. The first electrodes 201 and the second electrodes 202 are insulated from each other and disposed crosswise in the electrode blocks 20.

In the first direction, two of the first electrodes 201 adjacent to each other or two of the second electrodes 202 adjacent to each other are electrically connected by at least one first metal bridge 203. In the second direction, two of the first electrodes 201 adjacent to each other or two of the second electrodes 202 adjacent to each other are electrically connected by at least one second metal bridge 204.

Figure 2:
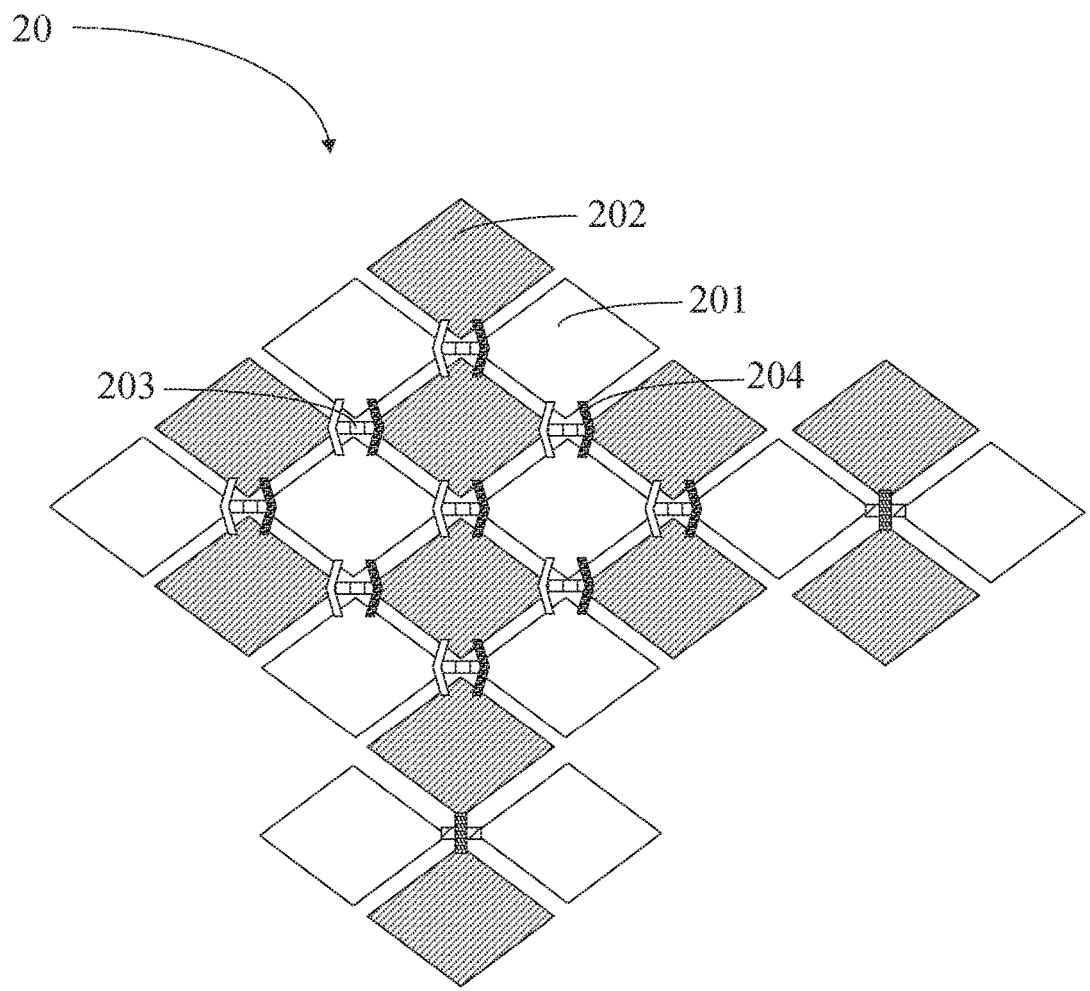
FIG. 2 is a first structural view of an electrode blocks in FIG. 1.

Please refer to FIG. 2. FIG. 2 is a first structural view of the electrode blocks of FIG. 1.

In an embodiment, each of the first electrode group includes eight first electrodes 201 arranged in the first direction. Each of the first electrode group includes three rows of the first electrodes 201, and the first electrodes 201 between a row and another row are electrically connected by two of the first metal bridges 203. Each of the second electrode group includes eight second electrodes 202 arranged in the second direction. Each of the second electrode group includes three columns of the second electrodes 202, and the second electrodes 202 between a column and another column are electrically connected by the two second metal bridges 204.

In an embodiment, each of the electrode blocks 20 may include 5×5, 6×6 and more electrode blocks 20. The first electrodes 201 may be one of driving electrodes or sensing electrodes, and the second electrodes 202 may be another one different from the first electrodes 201.

The first metal bridge 203 (or the second metal bridge 204) is belonged to the same metal layer of the first electrodes 201 and the second electrodes 202, and the first metal bridge 203 and the second metal bridge 204 are different metal layers.

Figure 3:
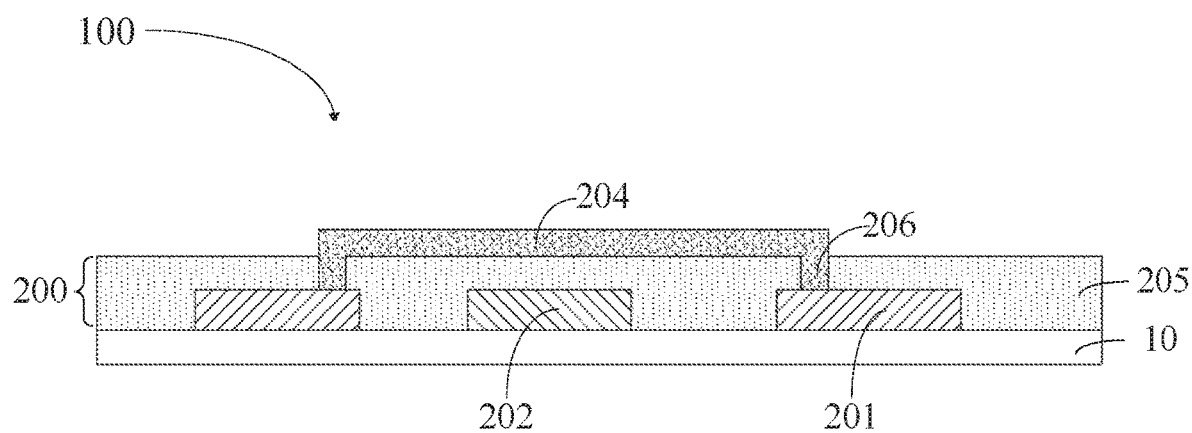
FIG. 3 is a structural view of a first film layer of the touch layer according to the present application.

Please refer to FIG. 3. FIG. 3 is a structural view of a first film layer of the touch layer according to the present application.

The first metal bridge 203 is belonged to the same metal layer of the first electrodes 201 and the second electrodes 202. At least one first insulating layer 205 is disposed between the second metal bridge 204 and the first electrodes 201, and disposed between the second metal bridge 204 and the second electrodes 202. The first insulating layer 205 is disposed on a base substrate 10 of the touch substrate 100.

A least two first via holes are formed in the first insulating layer 205, and the second metal bridge 204 electrically connects the two adjacent first electrodes 201 (or the two adjacent second electrodes) to each other by the first via holes 201.

In an embodiment, material of the first insulating layer 205 may be selected from the group consisting of silicon oxide, silicon nitride, and silicon oxynitride.

In an embodiment, the number of the second metal bridges 204 is not limited to two that is described in the embodiment, and may be three or more. A shape of the second metal bridge 204 is not limited to a long fold strip shape in the present application, and may be an irregular or regular shape such as other curved shapes, and will not be exemplified herein.

In the first direction, two of adjacent electrode blocks 20 adjacent to each other are electrically connected by at least one third metal bridge 30. In the second direction, two of adjacent electrode blocks 20 adjacent to each other are electrically connected by at least one fourth metal bridge 40.

Figure 4:
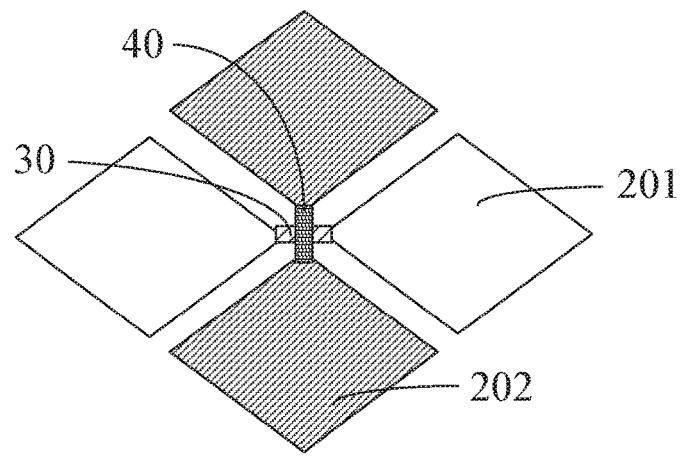
FIG. 4 is a structural view of connections of the electrode blocks in FIG. 1.

Please refer to FIG. 4. FIG. 4 is a structural view of connections of the electrode blocks in FIG. 1.

The two adjacent electrode blocks 20 are electrically connected by one of the third metal bridges 30, and the two adjacent electrode blocks 20 are electrically connected by one of the fourth metal bridges 40.

Please refer to FIG. 2, the third metal bridge 30 electrically connects the first electrodes 201 of the first electrode group in the two adjacent electrode blocks 20, and the fourth metal bridge 40 electrically connects the second electrodes 202 of the second electrode group in the two adjacent electrode blocks 20.

In an embodiment, the first electrodes 201 and the second electrodes 202 may exchange. The third metal bridge 30 electrically connects the second electrodes 201 of the second electrode group in the two adjacent electrode blocks 20, and the fourth metal bridge 40 electrically connects the first electrodes 202 of the first electrode group in the two adjacent electrode blocks 20.

In an embodiment, the third metal bridge 30 (or the fourth metal bridge 40) is belonged to a same metal layer of the first electrodes 201 and the second electrodes 202. The third metal bridge 30 and the fourth metal bridge 40 are different metal layers.

The third metal bridge 30 is belonged to a same metal layer of the first electrodes 201 and the second electrodes 202. At least one second insulating layer 305 is disposed between the forth metal bridge 40 and the first electrodes 201, and disposed between the forth metal bridge 40 and the second electrodes 202. The second insulating layer 305 is disposed on the base substrate 10 of the touch substrate 100. A least two second via holes 306 are formed in the second insulating layer 205, and the forth metal bridge 40 electrically connects the two adjacent first electrodes 201 (or the two adjacent second electrodes) to each other by the second via holes 306.

In an embodiment, the second insulating layer 305 is belonged to a same film layer structure of the first insulating layer 205.

The connection that the fourth metal bridge 40 is connected to the first electrodes 201 or the second electrodes 202 is in the same manner as shown in FIG. 3.

In an embodiment, the number of the fourth metal bridges 40 is not limited to one that is described in the embodiment, and may be one or more.

In an embodiment, a shape of the fourth metal bridge 40 is not limited to a strip shape shown in the present application, and may be an irregular or regular shape such as other curved shapes, and is not exemplified herein.

In an embodiment, the second metal bridge 204 and the fourth metal bridge 40 are belonged to the same metal layer, and the shape of the second metal bridge 204 may be the same as the shape of the fourth metal bridge 40. The second metal bridge 204 is located on the touch layer 200.

Figure 5:
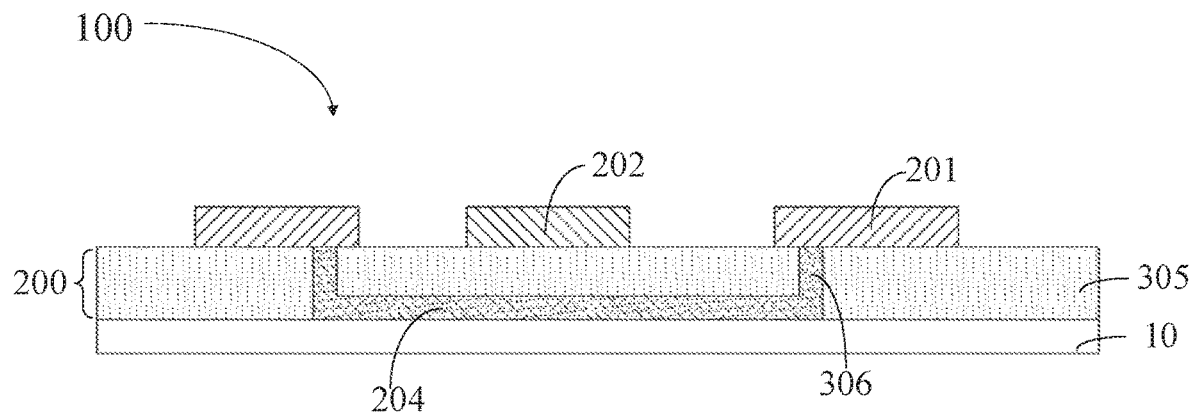
FIG. 5 is a structural view of a second film layer of the touch layer according to the present application.

Please refer to FIG. 5. FIG. 5 is a structural view of a second film layer of the touch layer according to the present application.

The metal layer which the second metal bridge 204 and the fourth metal bridge 40 are located is located between the base substrate 10 and the touch layer 200.

In an embodiment, a material of a metal layer of the second metal bridge 204 and the fourth metal bridge 40 may be a transparent metal material, such as indium tin oxide (ITO).

Because the touch layer 200 is located above the light emitting layer, in order not to affect the light emitting efficiency of the light emitting layer, the first electrodes 201 and the second electrodes 202 are transparent electrodes.

In an embodiment, a material of a metal layer of the first electrodes 201 and the second electrodes 202 is a transparent metal material, such as indium tin oxide (ITO).

In an embodiment, a shape of the first electrodes 201 may be, but not limited to, a diamond shape shown in FIG. 2.

In an embodiment, the shape of the first electrodes 201 may be selected from the group consisting of polygon, and circle.

In an embodiment, the first electrodes 201 may be, but not limited to, the above-mentioned shapes, and other irregular shapes that can also satisfy the designed solutions according to the present application.

In the above embodiment, the first electrodes 201 and the second electrodes 202 are both in the form of electrode units. A transparent electrode unit is disposed on each pixel unit.

Figure 6:
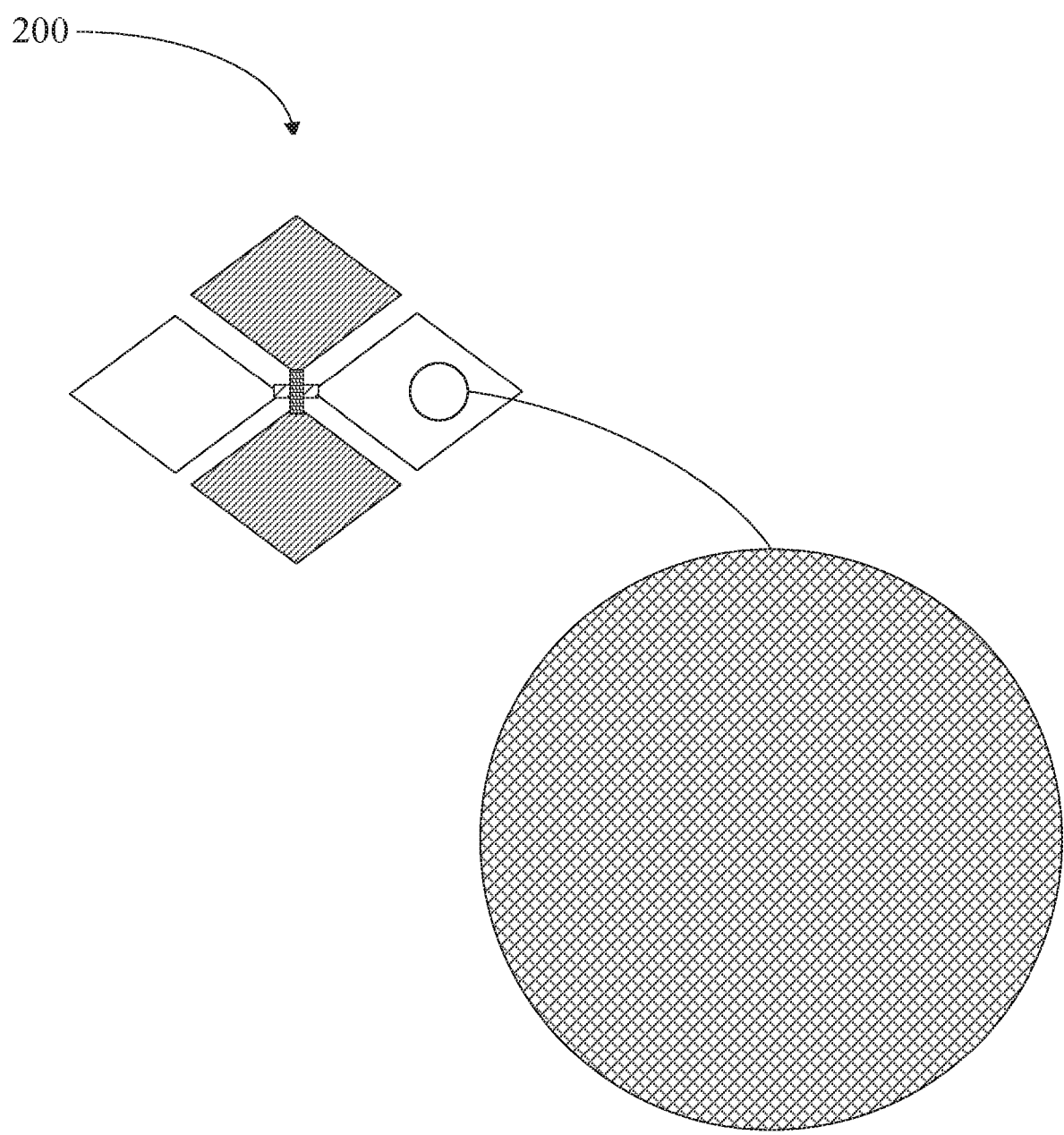
FIG. 6 is a second structural view of an electrode blocks according to the present application.

Please refer to FIG. 6. FIG. 6 is a second structural view of the electrode blocks according to the present application.

The touch layer 200 is formed in a form of a metal mesh. The touch layer 200 forms a metal mesh by arranging horizontally and vertically interlaced metal wires around each pixel unit. The metal wires corresponding to different property electrodes (for example, the touch electrodes and the sensing electrode) are insulated by breakpoints.

The present application increases the relative side lengths of the first electrode and the second electrode that is compared with prior art by forming first electrodes and second electrodes insulated from each other and disposed crosswise in the electrode blocks. According to the formula calculating the capacitance: $C=\varepsilon S/4\pi kd$, the fringe field capacitance of the touch layer according to the present application increases. When a finger contacts with the touch substrate, the change value of actual capacitance will increase, and the fringe field capacitance and the lateral capacitance will change, which increases the change value of total capacitance of the touch layer and improves the signal-noise ratio of the touch substrate, so the touch sensitivity of the touch substrate enhances.

According to another aspect according to the present application, a touch screen is further provided, the touch screen includes a touch substrate, and further includes a polarizing layer and a cover layer sequentially disposed on the touch substrate.

According to still another aspect according to the present application, an electronic device is provided, the electronic device includes the touch screen; the electronic device includes, but is not limited to, a mobile phone, a tablet computer, a computer display, a game consoles, a television, a display screen, a wearable device, and other living appliances or household appliances with display functions.

The working principle of the touch screen, and the working principle of the electronic device are similar to the working principle of the touch substrate. The working principle of the touch screen and the working principle of the electronic device may refer to the working principle of the touch substrate, and is not described herein again.

The present application provides a touch substrate, a touch screen, and an electronic device. The touch substrate includes a touch layer. The touch layer includes at least two electrode blocks arrange in a first direction and/or a second direction and sequentially connected to each other, the electrode blocks includes a first electrode group and a second electrode group; the first electrode group includes at least two first electrodes arranged in a first direction and/or a second direction, the second electrode group includes at least two second electrodes arranged in a first direction and/or a second direction, and the first electrodes and the second electrodes are insulated from each other and disposed crosswise in the electrode blocks. the present application increases relative side lengths of the first electrodes and the second electrode by providing first and second electrodes in the electrode blocks that are insulated from each other, and disposed crosswise, so the fringe field capacitance is increased, and the signal-noise ratio of the touch substrate is improved, results that enhances the touch sensitivity of the touch substrate.

In summary, although the present application has been disclosed in the above preferred embodiments, the preferred embodiments are not intended to limit the scope of the present application, and various modifications and refinements can be made by those skilled in the art without departing from the spirit and scope of the present application, and the protection scope of the present application is determined by the scope defined by the claims.

What is claimed is:

1. A touch substrate, comprising:
a substrate; and
a touch layer disposed on the substrate,
wherein the touch layer comprises at least two electrode blocks arranged in a first direction and/or a second direction and sequentially connected to each other, and the electrode blocks comprise first electrodes and second electrodes; and
wherein the first electrodes comprises at least two of the first electrodes arranged in the first direction and/or the second direction, the second electrodes comprises at least two of the second electrodes arranged in the first direction and/or the second direction, and the first electrodes and the second electrodes are insulated from each other and disposed crosswise in the electrode blocks,
wherein in the first direction, two of the electrode blocks adjacent to each other are electrically connected to each other by at least one third metal bridge; and
in the second direction, two of the electrode blocks adjacent to each other are electrically connected to each other by at least one fourth metal bridge,
wherein the third metal bridge electrically connects the first electrodes in the two adjacent electrode blocks, and the fourth metal bridge electrically connects the second electrodes in the two adjacent electrode blocks; or
wherein the third metal bridge electrically connects the second electrodes in the two adjacent electrode blocks, and the fourth metal bridge electrically connects the first electrodes in the two adjacent electrode blocks,
wherein the third metal bridge is the same metal layer of the first electrode and the second electrode, and at least one second insulating layer is disposed between the fourth metal bridge and the first electrode, and disposed between the fourth metal bridge and the second electrodes.

2. The touch substrate according to claim 1, wherein the first electrodes and the second electrodes in each of the electrode blocks are insulated from each other, and disposed crosswise on the touch layer.

3. The touch substrate according to claim 2, wherein in the first direction, two of the first or second electrodes adjacent to each other are electrically connected to each other by at least one first metal bridge; and
in the second direction, two of the first or second electrodes adjacent to each other are electrically connected to each other by at least one second metal bridge;
wherein the first metal bridge or the second metal bridge is belonged to a same metal layer of the first electrode and the second electrode, and the first metal bridge and the second metal bridge are different metal layers.

4. The touch substrate according to claim 3, wherein the first metal bridge is belonged to the same metal layer of the first electrode and the second electrode, and at least one first insulating layer is disposed between the second metal bridge and the first electrodes, and disposed between the second metal bridge and the second electrodes.

5. The touch substrate according to claim 4, wherein at least two first via holes are formed in the first insulating layer, and the second metal bridge electrically connects the two adjacent first or second electrodes to each other by the first via holes; and
wherein the second metal bridge is located between the substrate and the touch layer; or the second metal bridge is located on the touch layer.

6. The touch substrate according to claim 1, wherein at least two second via holes are formed in the second insulating layer, and the fourth metal bridge electrically connects the two adjacent second or fourth electrodes to each other by the second via holes; and
wherein the fourth metal bridge is located between the substrate and the touch layer; or the fourth metal bridge is located on the touch layer.

7. A touch screen, comprising:
a touch substrate, wherein the touch substrate comprises a substrate and a touch layer disposed on the substrate, and the touch layer comprises at least two electrode blocks arranged in a first direction and/or a second direction and sequentially connected to each other, and the electrode blocks comprises first electrodes and second electrodes; and
wherein the first electrodes comprises at least two of the first electrodes arranged in a first direction and/or a second direction, the second electrodes comprises at least two of the second electrodes arranged in a first direction and/or a second direction, and the first electrodes and the second electrodes are insulated from each other and disposed crosswise in the electrode blocks,
wherein in the first direction, two of the electrode blocks adjacent to each other are electrically connected to each other by at least one third metal bridge;
in the second direction, two of the electrode blocks adjacent to each other are electrically connected to each other by at least one fourth metal bridge; and
wherein the third metal bridge electrically connects the first electrodes in the two adjacent electrode blocks, and the fourth metal bridge connects the second electrodes in the two adjacent electrode blocks; or wherein the third metal bridge electrically connects the second electrodes in the two adjacent electrode blocks, and the fourth metal bridge connects the first electrodes in the two adjacent electrode blocks,
wherein the third metal bridge or the fourth metal bridge is belonged to a same metal layer of the first electrode and the second electrode, and the third metal bridge and the fourth metal bridge are different metal layers; and
the third metal bridge is belonged to the same metal layer of the first electrode and the second electrode, and at least one second insulating layer is disposed between the fourth metal bridge and the first electrode, and disposed between the fourth metal bridge and the second electrodes.

8. The touch screen according to claim 7, wherein the first electrodes and the second electrodes in each of the electrode blocks are insulated from each other and disposed crosswise on the touch layer.

9. The touch screen according to claim 8, wherein in the first direction, two of the first or second electrodes adjacent to each other are electrically connected to each other by at least one first metal bridge; and
in the second direction, two of the first or second electrodes adjacent to each other are electrically connected to each other by at least one second metal bridge;

wherein the first metal bridge or the second metal bridge is belonged to a same metal layer of the first electrode and the second electrode, and the first metal bridge and the second metal bridge are different metal layers; and wherein the first metal bridge is belonged to the same metal layer with the first electrode and the second electrode, and at least one first insulating layer is disposed between the second metal bridge and the first electrodes, and disposed between the second metal bridge and the second electrodes.

10. An electronic device, comprising:

a touch screen, the touch comprising:

a touch substrate, wherein the touch substrate comprises a substrate and a touch layer disposed on the substrate, and the touch layer comprising at least two electrode blocks arranged in a first direction and/or a second direction and sequentially connected to each other, and the electrode blocks comprises first electrodes and second electrodes; and wherein the first electrodes comprises at least two of the first electrodes arranged in a first direction and/or a second direction, the second electrodes comprises at least two of the second electrodes arranged in a first direction and/or a second direction, and the first electrodes and the second electrodes are insulated from each other and disposed crosswise in the electrode blocks, wherein in the first direction, two of the electrode blocks adjacent to each other are electrically connected to each other by at least one third metal bridge;

in the second direction, two of the electrode blocks adjacent to each other are electrically connected to each other by at least one fourth metal bridge; and wherein the third metal bridge electrically connects the first electrodes in the two adjacent electrode blocks, and the fourth metal bridge electrically connects the second electrodes in the two adjacent electrode blocks;

or wherein the third metal bridge electrically connects the second electrodes in the two adjacent electrode blocks, and the fourth metal bridge electrically connects the first electrodes in the two adjacent electrode blocks, wherein the third metal bridge or the fourth metal bridge is belonged to the same metal layer of the first electrode and the second electrode, and the third metal bridge and the fourth metal bridge are different metal layers; and wherein the third metal bridge is belonged to the same metal layer of the first electrode and the second electrode, and at least one second insulating layer is disposed between the fourth metal bridge and the first electrode, and disposed between the fourth metal bridge and the second electrodes.

11. The electronic device according to claim 10, wherein the first electrodes and the second electrodes in each of the electrode blocks are insulated from each other and disposed crosswise on the touch layer.

12. The electronic device according to claim 11, wherein in the first direction, two of the first or second electrodes adjacent to each other are electrically connected to each other by at least one first metal bridge; and in the second direction, two of the first or second electrodes adjacent to each other are electrically connected to each other by at least one second metal bridge;

wherein the first metal bridge or the second metal bridge is belonged to a same metal layer of the first electrode and the second electrode, and the first metal bridge and the second metal bridge are different metal layers; and wherein the first metal bridge is belonged to the same metal layer with the first electrode and the second electrode, and at least one first insulating layer is disposed between the second metal bridge and the first electrodes, and disposed between the second metal bridge and the second electrodes.

* * * * *